(12) United States Patent
Katano

(10) Patent No.: US 8,179,612 B2
(45) Date of Patent: May 15, 2012

(54) RETRACTABLE LENS BARREL UNIT

(75) Inventor: Kenichi Katano, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 85 days.

(21) Appl. No.: 12/840,714

(22) Filed: Jul. 21, 2010

(65) Prior Publication Data

US 2011/0026136 A1 Feb. 3, 2011

(30) Foreign Application Priority Data

Jul. 28, 2009 (JP) .................................. 2009-175020

(51) Int. Cl.
*G02B 15/14* (2006.01)
(52) U.S. Cl. ........................ 359/700; 359/701; 359/704
(58) Field of Classification Search .................. 359/700, 359/811, 813, 819–824
See application file for complete search history.

(56) References Cited

U.S. PATENT DOCUMENTS

| 7,373,082 B2* | 5/2008 | Yamazaki et al. .............. 396/72 |
| 2009/0040369 A1* | 2/2009 | Miyoshi ........................ 348/374 |

FOREIGN PATENT DOCUMENTS

| CN | 1708711 A | 12/2005 |
| CN | 101363951 A | 2/2009 |
| JP | 2007-034069 | 2/2007 |

OTHER PUBLICATIONS

The above references were cited in a Feb. 6, 2012 Chinese Office Action, which is enclosed with an English Translation, that issued in Chinese Patent Application No. 201010232848.9.

* cited by examiner

*Primary Examiner* — Ricky Mack
*Assistant Examiner* — Brandi Thomas
(74) *Attorney, Agent, or Firm* — Cowan, Liebowitz & Latman, P.C.

(57) ABSTRACT

A lens barrel unit includes a lens holding cylinder, a cam cylinder, and a straightforward movement cylinder. The lens holding cylinder includes a ring-shaped step that projects outward in a radial direction. In an image pickup state, a surface of the ring-shaped step which is an end of an object side in the ring-shaped step is closer to an object than a surface of the straightforward movement cylinder which is an end of an object side in the straightforward movement cylinder.

2 Claims, 9 Drawing Sheets

RETRACTABLE LENS BARREL UNIT

BACKGROUND OF THE INVENTION

1. Field of the Invention

The present invention relates to a lens barrel unit.

2. Description of the Related Art

Japanese Patent Laid-Open No. ("JP") 2007-34069 discloses a lens barrel in which a lens holding cylinder has a ring-shaped step larger than an aperture diameter of a cam cylinder, and a top of a straightforward movement cylinder engaged with the cam cylinder projects ahead of a back portion in an image pickup state.

However, the light shielding effect becomes insufficient in JP 2007-34069, as a result of that the light enters an aperture between the top of the straightforward movement cylinder and the back portion of the lens holding cylinder through an aperture between a surface that defines an aperture of the cam cylinder and a front portion of the lens holding cylinder.

SUMMARY OF THE INVENTION

The present invention provides a lens barrel unit having a good light shielding effect.

A lens barrel unit according to one aspect of the present invention includes a lens holding cylinder configured to hold a lens, a cam cylinder including a cam groove configured to engage with the lens holding cylinder and define a movement of the lens holding cylinder in an optical axis direction, and a straightforward movement cylinder inserted into the cam cylinder, and configured to engage with the cam cylinder and move with the cam cylinder in the optical axis direction. The lens holding cylinder includes a ring-shaped step that projects outward in a radial direction. In an image pickup state, a surface of the ring-shaped step which is an end of an object side in the ring-shaped step is closer to an object than a surface of the straightforward movement cylinder which is an end of an object side in the straightforward movement cylinder.

Further features of the present invention will become apparent from the following description of exemplary embodiments with reference to the attached drawings.

DESCRIPTION OF THE EMBODIMENTS

Figure 1:
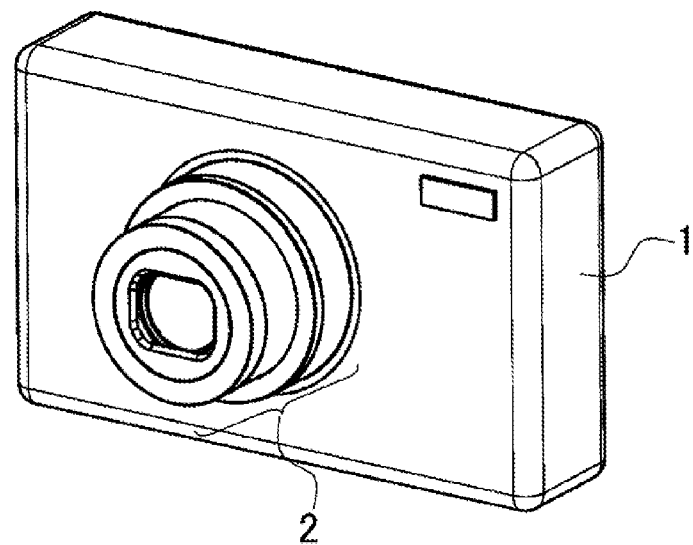
FIG. 1 is a perspective view of an image pickup apparatus according to this embodiment.

FIG. 1 is a perspective view of an image pickup apparatus (digital camera) 1 of this embodiment. As illustrated in FIG. 1, the camera 1 includes a camera body 1 and a lens barrel unit 2. The lens barrel unit 2 is a retractable barrel configured to project from the camera body 1 at an image pickup time and to retract into the camera body 1 at a non-image pickup time.

Figure 2:
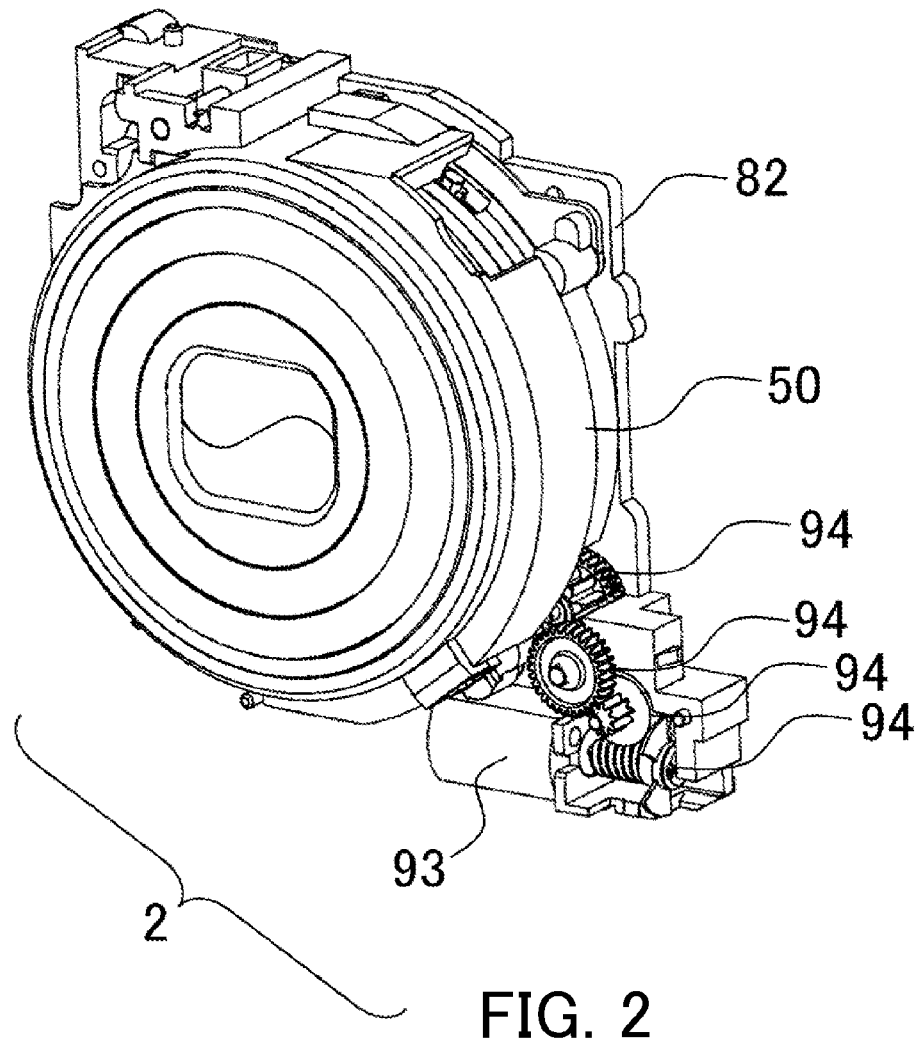
FIG. 2 is a perspective view of a lens barrel unit illustrated in FIG. 1.
Figure 3:
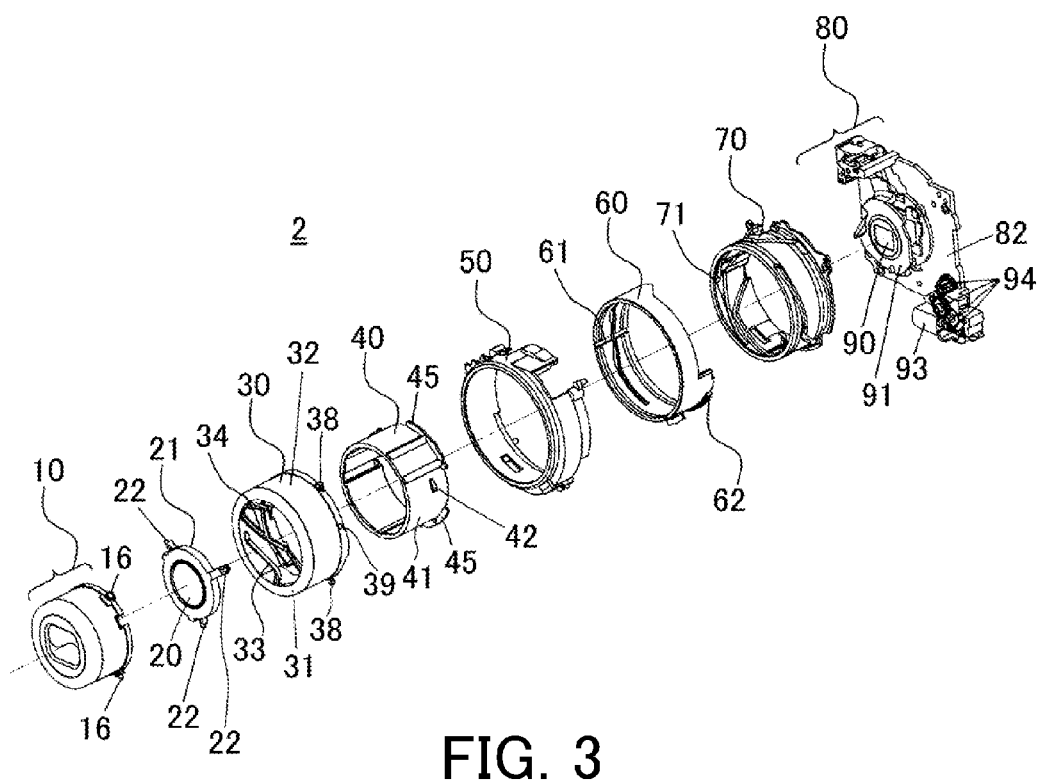
FIG. 3 is an exploded perspective view of the lens barrel unit illustrated in FIG. 2.
Figure 4:
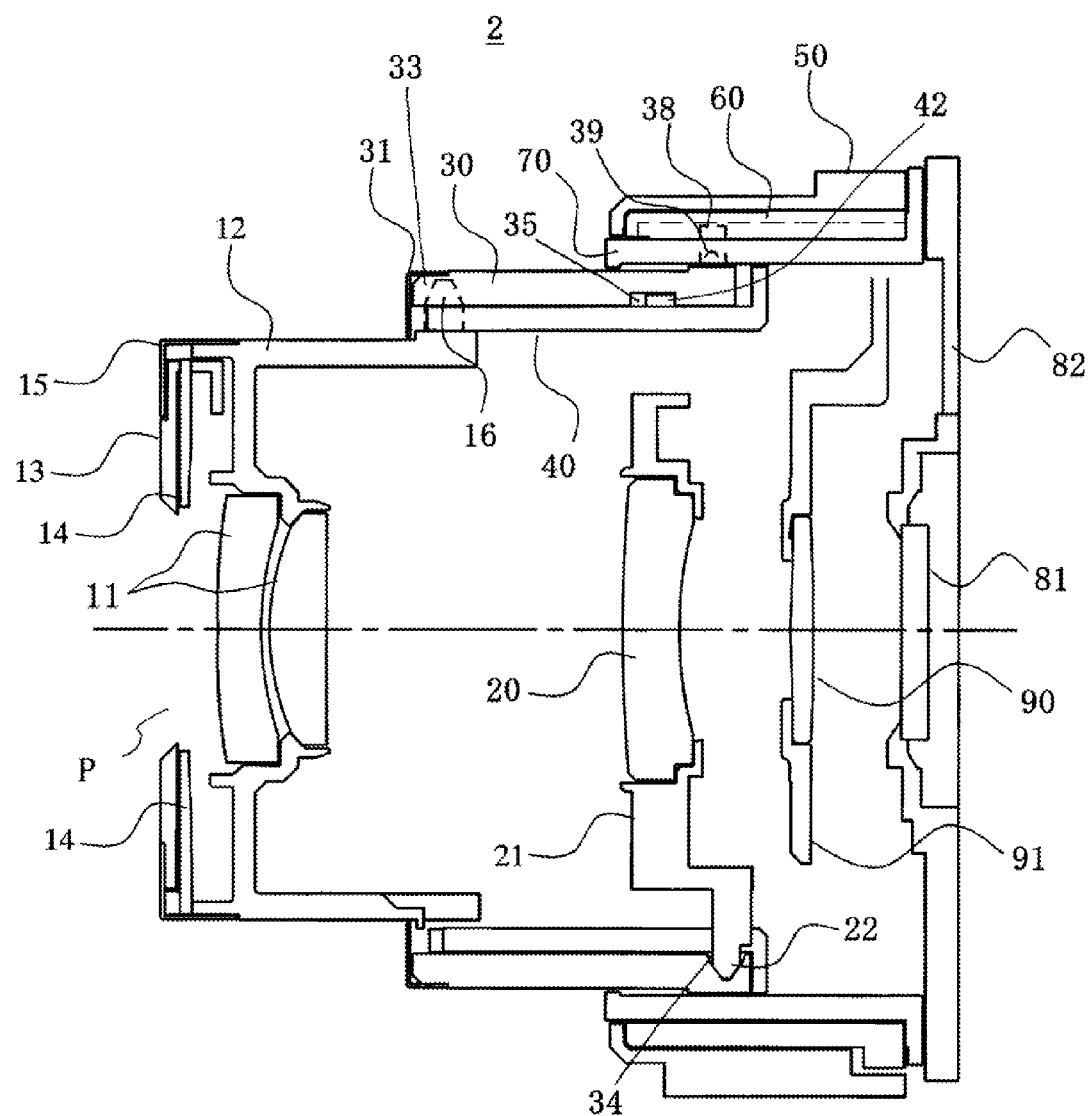
FIG. 4 is a section view of the lens barrel unit illustrated in FIG. 2 in an image pickup state.
Figure 5:
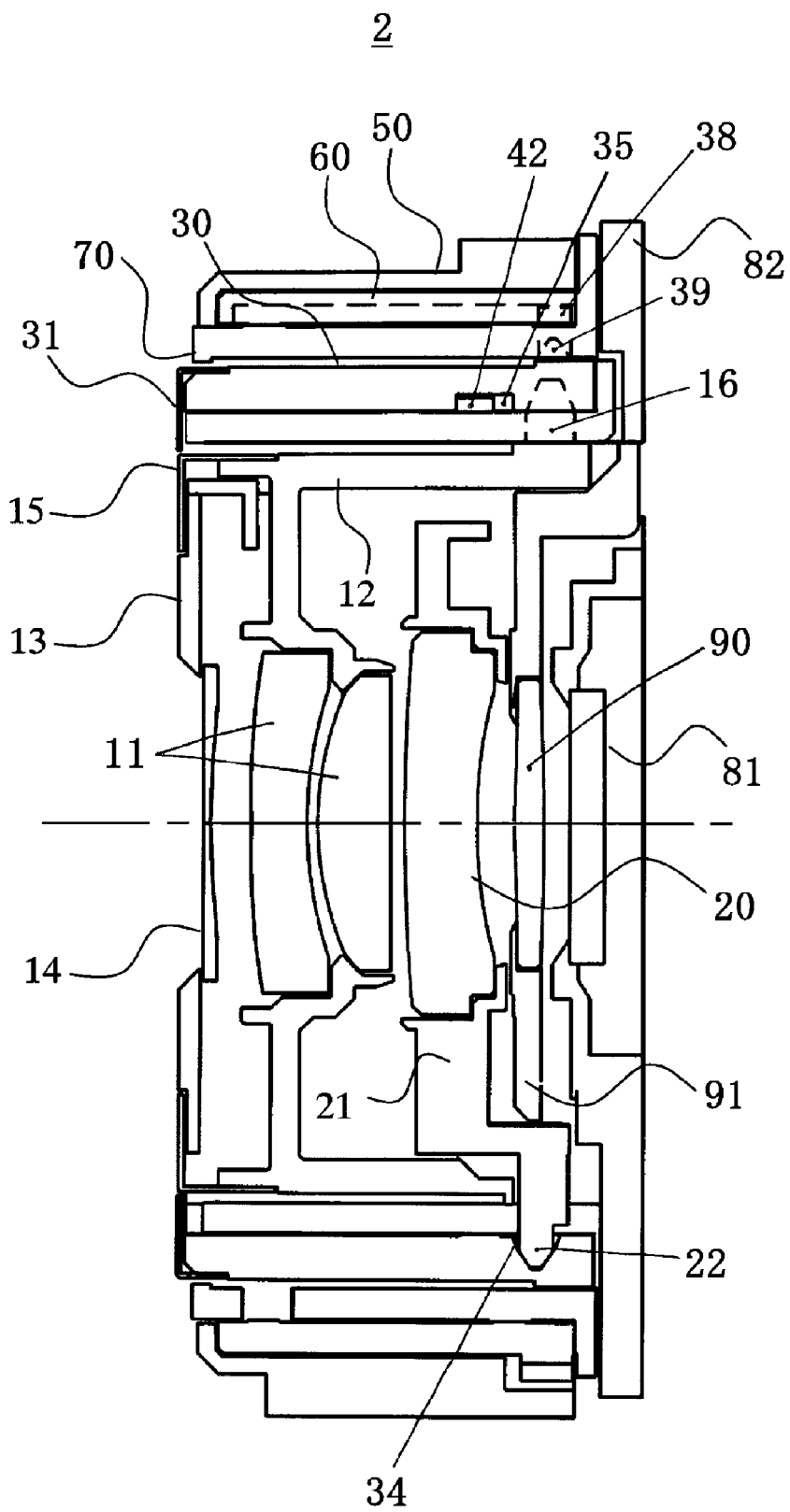
FIG. 5 is a sectional view of the lens barrel unit in FIG. 2 in a retraction state.

FIG. 2 is a perspective view of the lens barrel unit 2. FIG. 3 is an exploded perspective view of the lens barrel unit 2. FIG. 4 is a sectional view of the lens barrel unit 2 at the image pickup state. FIG. 5 is a sectional view of the lens barrel unit 2 at the retraction state.

The lens barrel unit 2 is of a two-step retractable type including a first cylinder unit 10, a second cylinder unit, and a third cylinder unit, and can change its length in the optical axis direction illustrated by an alternate long and short dash line in FIGS. 3-5 between the image pickup time and the retraction time. The lens barrel unit 2 includes an image pickup lens group including three groups, i.e., a first lens 11, a second lens 20, and a third lens 90. The first lens 11 is held by a first cylinder 12 of the first cylinder unit 10, the second lens 20 is held by a second holder 21 of the second cylinder unit, and the third lens 90 is held by a third holder 91 of the third cylinder unit.

The first cylinder unit 10 includes a first cylinder (lens holding cylinder) 12, a first cover 13, barrier blades 14, and a first cap 15. Three cam pins 16 project in the radial direction at regular intervals of 120° at the outer circumferential end of the first cylinder 12. Each cam pin 16 is engaged with a cam groove 33 of a cam cylinder 30, which will be described later. The barrier blade 14 is linked with an operation of the lens barrel unit 2, and opens an aperture P in the image pickup state illustrated in FIG. 4 and closes the aperture P in the retraction state illustrated in FIG. 5.

The second cylinder unit includes a cam cylinder 30 and a straightforward movement cylinder 40 that are bayonet-coupled with each other, and the cam cylinder 30 is engaged with the second holder 21. Three cam pins 22 project in the radial direction around the outer circumference of the second holder 21 at regular intervals of 120°, and each cam pin 22 is engaged with a cam groove 34 of the cam cylinder 30, which will be described later. In addition, due to the bayonet coupling, the cam cylinder 30 and the straightforward movement cylinder 40 move together in the optical axis direction.

Figure 6:
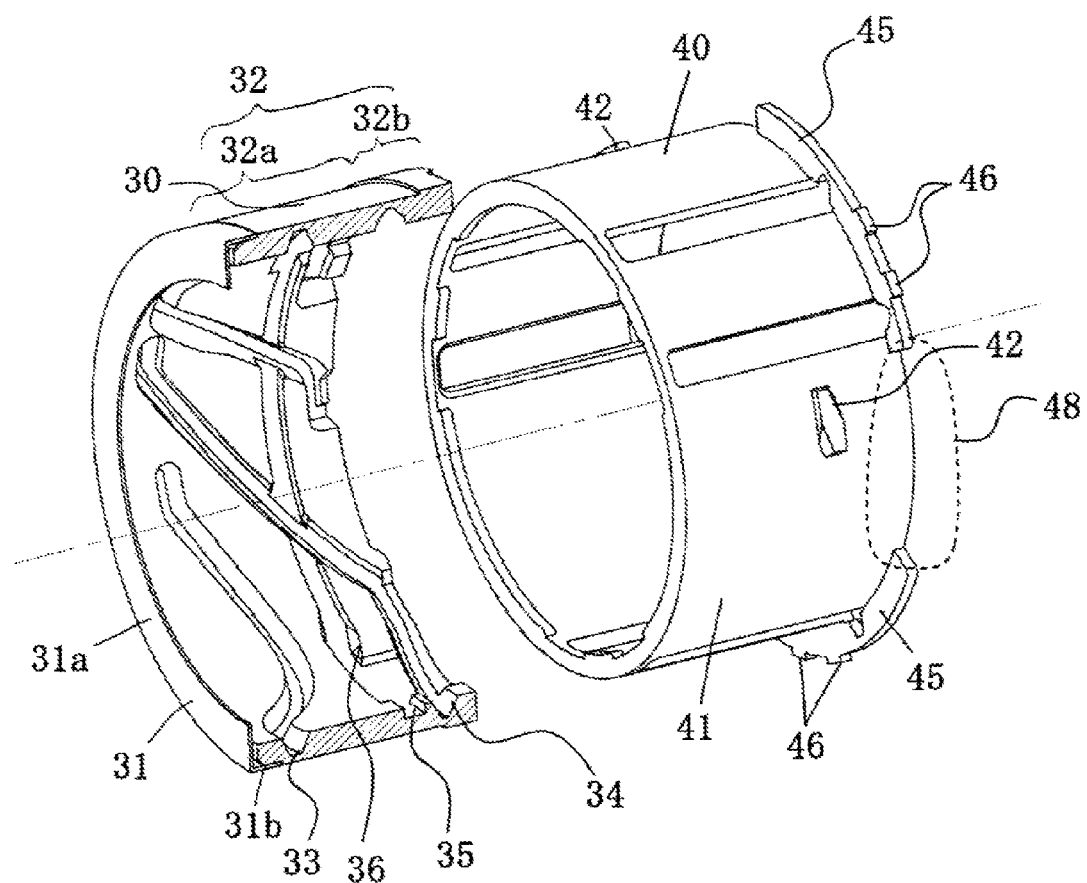
FIG. 6 is a perspective view of a cam cylinder and a straightforward movement cylinder in the lens barrel unit illustrated in FIG. 1.
Figure 7:
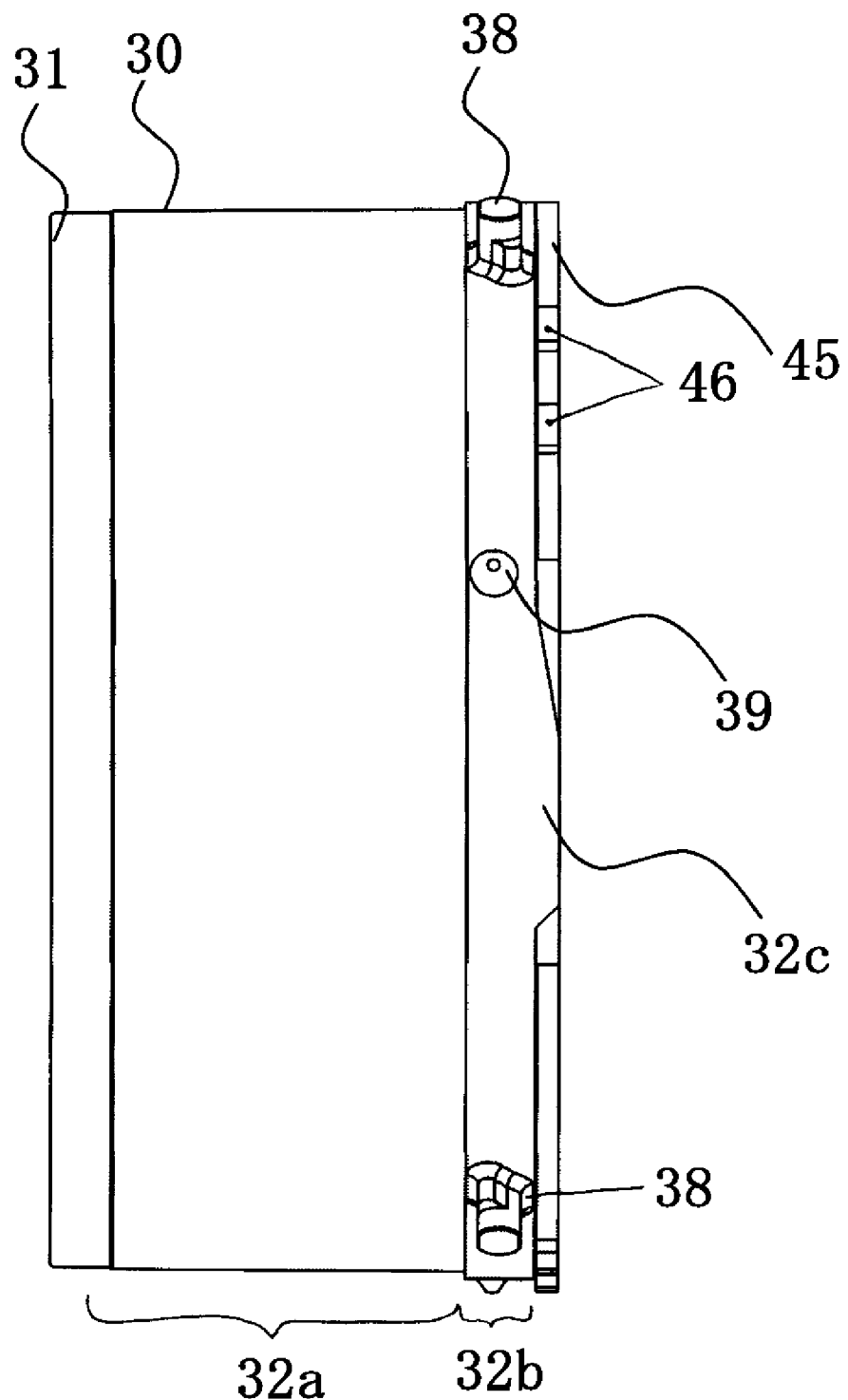
FIG. 7 is a side view of the cam cylinder and the straightforward movement cylinder illustrated in FIG. 6 in the retraction state.
Figure 8:
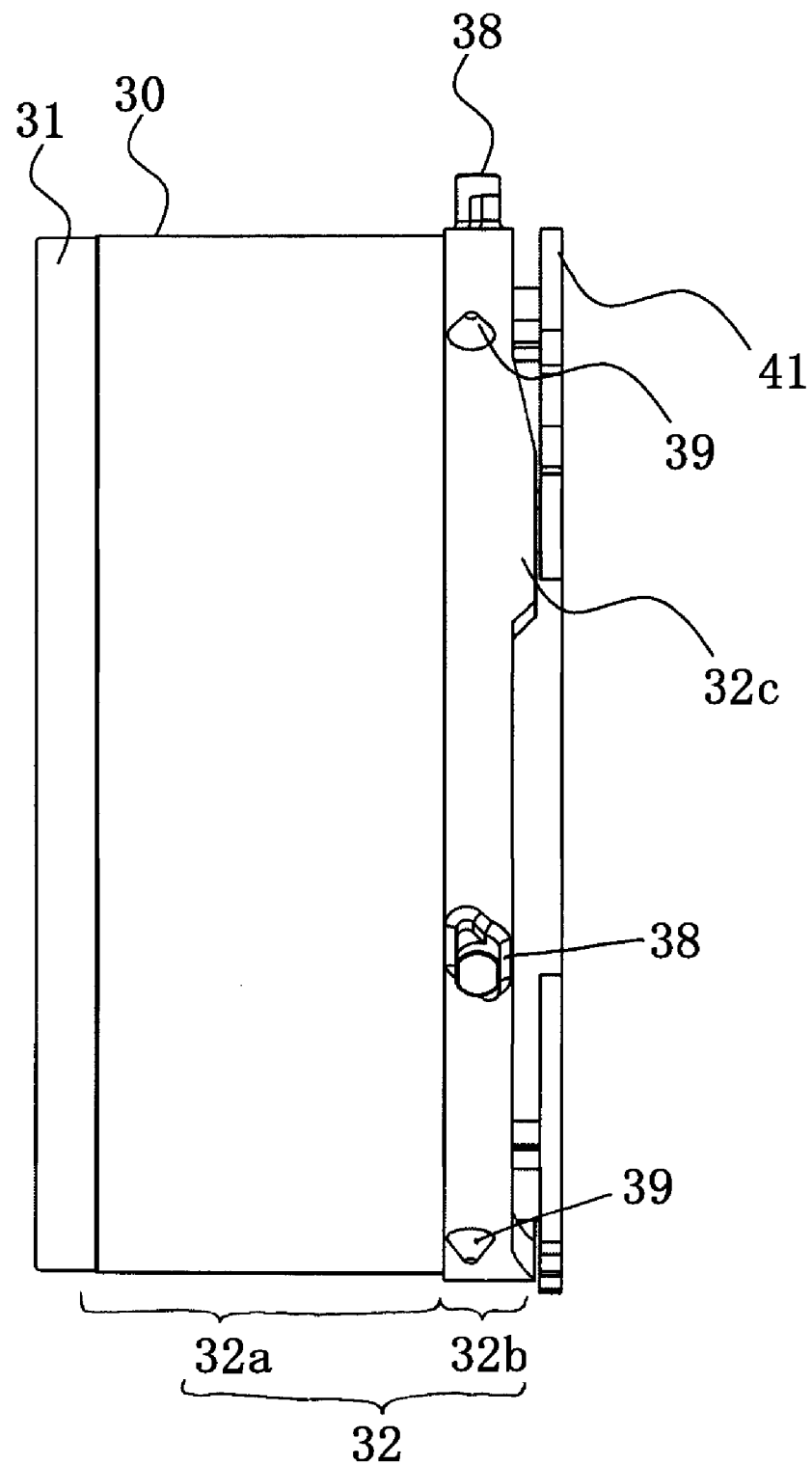
FIG. 8 is a side view of the cam cylinder and the straightforward movement cylinder illustrated in FIG. 6 in the image pickup state.

FIG. 6 is an enlarged perspective view of the cam cylinder 30 and the straightforward movement cylinder 40, in which a part of the cam cylinder 30 is ruptured. FIG. 7 is a side view of the cam cylinder 30 and the straightforward movement cylinder 40 in the retraction state, and FIG. 8 is a side view of the cam cylinder 30 and the straightforward movement cylinder 40 in the image pickup state.

The cam cylinder 30 includes, as illustrated in FIG. 6, a cap 31 and a cylinder body 32. The cap 31 may be integrated with the cylinder body 32.

The cap 31 is a light shield that has an L-shaped section, and is provided at the head of the cam cylinder 30 on the side of the first cylinder unit 10. The cap 31 includes a front 31a that covers a top surface of the cylinder body 32 on the side of the first cylinder unit 10, and a side 31b that covers a part of a side surface of the cylinder body 32 on the side of the first cylinder unit 10.

The cylinder body 32 includes a center 32a, a rim 32b, and a projection 32c.

The center 32a has a step at the end of its side surface on the side of the first cylinder unit 10, to which the side 31b of the cap 31 is attached. Thereby, an outer surface of the side 31b can be level with an outer surface of the center 32a of the cylinder body 32.

Figure 9:
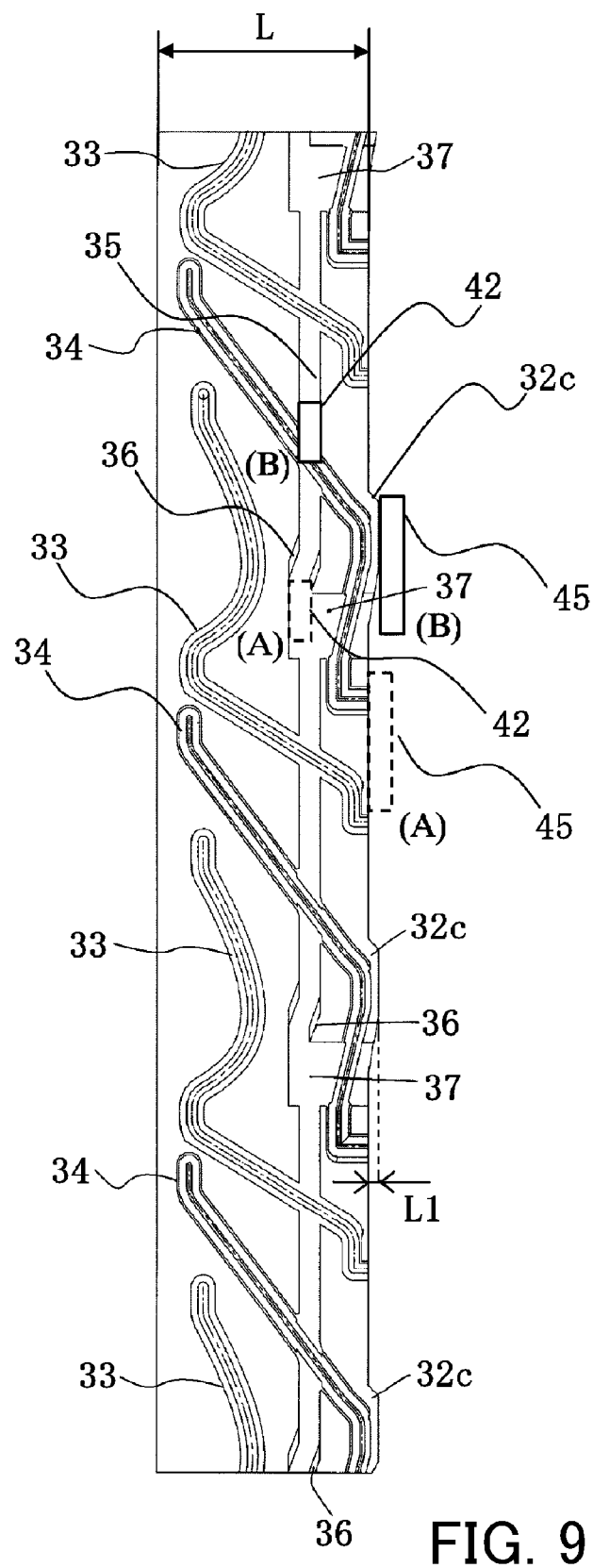
FIG. 9 is a developed view of the cam cylinder illustrated in FIG. 6.

FIG. 9 is a plane view made by developing an inner surface of the cylinder body 32 of the cam cylinder 30 in the circumferential direction. As illustrated in FIG. 9, the inner surface of the cylinder body 32 has three cam grooves 33 and three cam grooves 34 in the circumferential direction. In addition, the inner surface of the cylinder body 32 has an engagement groove 35 that extends over the circumference.

Each cam pin 16 of the first cylinder unit 10 is engaged with the corresponding cam groove 33, and the cam grooves 33 define (control) a movement (amount) of the first cylinder unit 10 in the optical axis direction. Each cam pin 22 of the second holder 21 is engaged with the corresponding cam groove 34, and the cam grooves 34 define (control) a movement (amount) of the second holder 21 in the optical axis direction. The first cylinder unit 10 and the second holder 21 can move back and forth in the optical direction due to the rotations of the cam cylinder 30 and the rotational restrictions of the straightforward movement cylinder 40. The cam grooves 33 and 34 have different shapes and are arranged so that they cannot overlap each other. A part of the cam groove 34 extends in the projection 32c.

The engagement groove 35 extends in the circumferential direction of the cylinder body 32, and partially includes inclination grooves 36 and home sections 37 arranged at regular intervals of 120°. The engagement groove 35 is engaged with engagement members of the straightforward movement cylinder 40, which will be described later. In order to change a distance between the cam cylinder 30 and the straightforward movement cylinder 40 in the optical axis direction, the inclination groove 36 inclines relative to or is not parallel to the circumferential direction (longitudinal direction) illustrated in FIG. 9, differently from the engagement groove 35.

The rim 32b is provided on the cylinder body on the side of the third cylinder unit, projects higher than the center 32a in the radial direction, forming a step. The cam groove 33 is provided on the inner surface of the center 32a, but a part of the cam groove 34 extends to a part of the end 32b as illustrated in FIG. 6 (and to the projection 32c as illustrated in FIG. 9).

Three drive pins 38 are provided on the outer circumference surface of the rim 32b at regular intervals of 120°, and three cam pins 39 are provided on the outer circumference surface of the rim 32b at regular intervals of 120°. Each drive pin 38 is engaged with a corresponding key groove 61 of the rotary cylinder 60, and the cam cylinder 30 rotates with the rotary cylinder 60. Each cam pin 39 is engaged with a corresponding cam groove 71 of the fixture cylinder 70, and the cam cylinder 30 moves in the optical axis direction following the locus of the cam groove 71.

Three projections 32c project in the optical direction from the end of the rim 32b toward the third cylinder unit. Each projection 32c can be inserted into and escape from a corresponding notch 48 of the straightforward movement cylinder 40. As illustrated in FIG. 9, a part of the cam groove 34 is formed in each projection 32c. In FIG. 9, the projection 32c has an approximately trapezoidal shape and a length of the cam cylinder 30 except for the projection 32c is L in the optical axis direction as illustrated. This embodiment shortens the length of the cam cylinder 30 in the optical axis direction (or the length of the lens barrel unit 2) by the length of the projection 32c, i.e., L1 shown in FIG. 9.

The straightforward movement cylinder 40 is configured to move in the optical axis direction in association with the operation of the cam cylinder 30, and to restrict a rotation of the first cylinder 12 and the second holder 21. The straightforward movement cylinder 40 includes a cylinder body 41, a plurality of (three in this embodiment) flanges 45 formed at the end of the cylinder body 41 on side of the third cylinder unit and projecting to the outside of the cylinder body 41 in the radial direction, and three notches 48 formed among these three flanges 45.

The cylinder body 41 is inserted into the cam cylinder 30. Three engagement members 42 project and are arranged at regular intervals of 120° on the outer circumferential surface of the cylinder body 41, and each engagement member 42 is engaged with the corresponding engagement groove 35 of the cam cylinder 30. Due to this engagement, the cam cylinder 30 and the straightforward movement cylinder 40 move together in the optical axis direction. As described above, when the engagement members 42 of the straightforward movement cylinder 40 are guided by the engagement groove 35 having the inclination grooves 36, an arrangement changes in the optical axis direction between the cam cylinder 30 and the straightforward movement cylinder 40.

The flange 45 has three pairs of straightforward movement keys 46 configured to engage with the fixture cylinder 70 and to restrict a rotation of the fixture cylinder 70. While the thickness of the flange 45 in the optical axis direction corresponds to the length of the above projection 32c in this embodiment, they do not have to be equal to each other.

The third cylinder unit includes a cover cylinder 50, a rotary cylinder 60, a fixture cylinder 70, and an image pickup device unit 80. The cover cylinder 50 and the rotary cylinder 60 are arranged outside of the fixture cylinder 70. The image pickup device unit 80 includes an image pickup device 81, a third holder 91, a motor 93, etc.

The cover cylinder 50 is fixed with the rotary cylinder 60 and a holder 82 configured to hold the image pickup device 81, and held on the camera body 1. As illustrated in FIG. 2, the holder 82 holds a motor 93 as a driving source for zooming, and a gear row 94 configured to transmit the power from the motor 93. The gear row 94 is engaged with a gear 62 provided on the outer circumferential surface of the rotary cylinder 60 in the circumferential direction, and the rotary cylinder 60 rotates around the optical axis along the outer circumference of the fixture cylinder 70.

Figure 10:
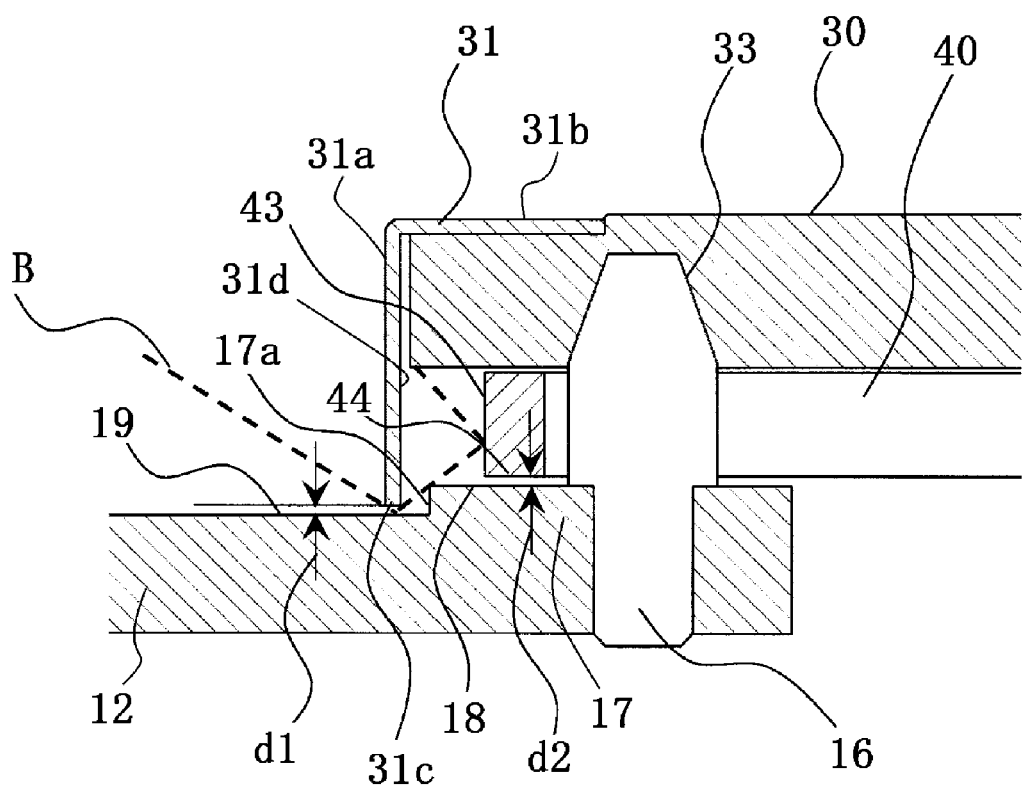
FIG. 10 is a partially enlarged sectional view of FIG. 4.

FIG. 10 is a partially enlarged section of FIG. 4. The front 31a of the cap 31 narrows an opening of the cam cylinder 30, and a side surface 31c defines a diameter of the opening of the top of the cam cylinder 30. The first cylinder 12 is inserted into the opening of the cam cylinder 30. The first cylinder 12 includes, at its end, a projecting, ring-shaped step 17 that has a diameter larger than that of the opening at the top of the cam cylinder 30 (or an opening diameter defined by the side surface 31c). A diameter of a side surface 18 of the ring-shaped step 17 is larger than that of a side surface 19 of a part of the first cylinder 12 that is located inside of the ring-shaped step 17 and opposite to the side surface 31c. The diameter of the side surface 19 is smaller than the diameter of the side surface 31c. The ring-shaped step 17 has the cam pin 16.

There is an aperture d1 between the side surface 31c and the side surface 19 of the first cylinder 12. The step formed by the ring-shaped step 17 (or the step formed between the side surfaces 18 and 19) prevents light B entering from the aperture d1 from entering an aperture d2 that is formed between the inner surface 44 and the side surface 18, and enhances the light shielding effect. In addition, in the image pickup state, a front surface 17a that is located at the end of the object side in the ring-shaped step 17 is located closer to the object than a front surface 43 that is the end of the object side in the straightforward movement cylinder 40.

Further, as described later, in a transfer process from the retraction state to the image pickup state, the cam cylinder 30 and the straightforward movement cylinder 40 move relative to each other, and hence an aperture amount formed between a rear surface 31d of the cap 31 and the front surface 43 of the straightforward movement cylinder 40 is different between the retraction state and the image pickup state.

A description will now be given of a retraction and a projection of the lens barrel unit 2.

In the retraction state, as illustrated in FIGS. 5 and 7, each projection 32c of the cam cylinder 30 enters the space as the notch 48 of the straightforward movement cylinder 40. In the retraction state, in FIG. 9, the engagement member 42 and the flange 45 are located in a space (A) illustrated by a dotted line. In other words, the engagement member 42 is located at the home section 37, and the flange 45 is adjacent to the projection 32c in the circumferential direction of the cam cylinder 30. This embodiment shortens the length of the lens barrel unit 2 in the optical axis direction by L1 by inserting the projection 32c into the notch 48.

If there is no projection 32c in FIG. 9, a portion corresponding to the projection 32c of the cam groove 34 discontinues, making an engagement between the cam groove 34 and the cam pin 22 unstable and a movement of the second lens 20 unstable. On the other hand, if the end surface of the cam cylinder 30 on the third cylinder unit side is located at the end surface position illustrated by a dotted line of the projection 32c, the engagement between the cam groove 34 and the cam pin 22 is maintained stable but the length of the cam cylinder 30 in the optical axis direction becomes L+L1 and the miniaturization is hindered.

Next, the retraction state transfers to the image pickup state illustrated in FIGS. 4 and 8. In the image pickup state, the engagement member 42 and the flange 45 are located at a position (B) illustrated by a solid line in FIG. 9. In other words, the engagement member 42 moves to the engagement groove 35, and the flange 45 is adjacent to the projection 32c of the cam cylinder 30 in the optical axis direction.

The engagement groove 35 extends in the circumferential direction. If the engagement member 42 is located in the engagement groove 35 in the retraction state, the height (position) of the engagement member 42 in the cam cylinder 30 does not change in the optical axis direction in the transfer from the retraction state to the image pickup state. Due to a fixed positional relationship between the engagement member 42 and the flange 45, unless the position of the engagement member 42 changes, the position of the flange 45 does not change, and the flange 45 collides with the projection 32c as the engagement member 42 moves from the dotted line position to the solid line position in FIG. 9.

Accordingly, this embodiment provides the inclination groove 36 that is connected to the engagement groove 35 and inclines relative to the circumferential direction. In the transfer from the retraction state to the image pickup state, the engagement member 42 passes the inclination groove 36 and its position changes in the cam cylinder 30 in the optical axis direction. In FIG. 9, the engagement member 42 moves to the right side by the height of the inclination groove 36 in the optical axis direction in moving from the dotted line position to the solid line position in FIG. 9. As a result, the flange 45 moves to the right side by this height. As a consequence, the cam cylinder 30 and the straightforward movement cylinder 40 can move in the optical axis direction relative to each other, and hence the projection 32c moves ahead of the flange 45 without colliding with the flange 45. This height corresponds to above L1 in this embodiment.

In the transfer from the retraction state to the image pickup state, the engagement between the cam groove 33 and the cam pin 16 and the engagement between the cam groove 34 and the cam pin 22 are maintained. Hence, movements of the lens unit become stable unlike the case in which the cam pin (cam follower) and the cam groove are disengaged from each other.

In the image pickup state, as shown in FIG. 10, the straightforward movement cylinder 40 separates from the cam cylinder 30 backwardly, and the front surface 17a of the ring-shaped step 17 is located ahead of the front surface 43 of the straightforward movement cylinder 40. Thus, the light B that has entered from the aperture d1 is reflected on the front surface 43 of the straightforward movement cylinder 40, and is not directly reflected on the inner surface 44 of the straightforward movement cylinder 40 and does not further proceed to the inside, thereby the light B is restrained from entering the aperture d2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The image pickup apparatus including a retractable lens barrel unit can be applied to the photography of an object.

This application claims the benefit of Japanese Patent Application No. 2009-175020, filed Jul. 28, 2009, which is hereby incorporated by reference herein in its entirety.

What is claimed is:

1. A lens barrel unit comprising:
a lens holding cylinder configured to hold a lens;
a cam cylinder including a cam groove configured to engage with the lens holding cylinder and define a movement of the lens holding cylinder in an optical axis direction;
a straightforward movement cylinder inserted into the cam cylinder, and configured to engage with the cam cylinder and move with the cam cylinder in the optical axis direction,
a light shield provided at the top of the cam cylinder and configured to form an opening,
wherein the lens holding cylinder includes a ring-shaped step that projects outward in a radial direction,
wherein in an image pickup state, a surface of the ring-shaped step which is an end of an object side in the ring-shaped step is closer to an object than a surface of the straightforward movement cylinder which is an end of an object side in the straightforward movement cylinder,
wherein a diameter of the opening of the light shield is larger than an external diameter of the lens holding cylinder, and a diameter of the ring-shaped step is larger than the diameter of the opening of the light shield, and
wherein an amount by which the ring shaped step projects outward in the radial direction is configured so that, in image pickup state, light does not proceed to an aperture between the straightforward movement cylinder and the ring-shaped step in a direction perpendicular to the optical axis direction, the light proceeding into the lens barrel unit from an aperture between a circumference of the opening of the light shield and the lens holding cylinder in the direction perpendicular to the optical axis direction.

2. The lens barrel unit according to claim 1, wherein the cam cylinder further includes an engagement groove configured to extend in a circumference direction, and an inclination groove connected to the engagement groove and configured to incline relative to the circumference direction,
   wherein the straightforward movement cylinder includes a cylinder body that includes an engagement member configured to engage with the engagement groove and the inclination groove of the cam cylinder and is inserted into the cam cylinder, and wherein, in a transfer from a retraction state to the image pickup state, the engagement member passes the inclination groove and changes a position in the cam cylinder in the optical axis direction, thereby moving the straightforward movement cylinder relative to the cam cylinder in the optical axis direction.

* * * * *